(12) United States Patent
Flores-Figueroa et al.

(10) Patent No.: US 10,815,327 B2
(45) Date of Patent: Oct. 27, 2020

(54) COPOLYMERS COMPRISING POLYALKYLENE OXIDE GROUPS AND QUATERNARY NITROGEN ATOMS

(71) Applicant: BASF SE, Ludwigshafen am Rhein (DE)

(72) Inventors: Aaron Flores-Figueroa, Ludwigshafen am Rhein (DE); Martin Ruebenacker, Ludwigshafen am Rhein (DE); Rainer Dobrawa, Lampertheim (DE); Markus Brym, Ludwigshafen am Rhein (DE); Dieter Boeckh, Ludwigshafen am Rhein (DE); Frank Huelskoetter, Cincinnati, OH (US); Glenn Ward, Cincinnati, OH (US); James Goodwin, Cincinnati, OH (US); Melissa Cuthbertson, Cincinnati, OH (US); Stefano Scialla, Cincinnati, OH (US)

(73) Assignee: BASF SE (DE)

( * ) Notice: Subject to any disclaimer, the term of this patent is extended or adjusted under 35 U.S.C. 154(b) by 103 days.

(21) Appl. No.: 16/091,133

(22) PCT Filed: Mar. 31, 2017

(86) PCT No.: PCT/EP2017/057757
§ 371 (c)(1),
(2) Date: Oct. 4, 2018

(87) PCT Pub. No.: WO2017/174468
PCT Pub. Date: Oct. 12, 2017

(65) Prior Publication Data
US 2019/0359751 A1 Nov. 28, 2019

(30) Foreign Application Priority Data
Apr. 8, 2016 (EP) .................................... 16164376

(51) Int. Cl.
C08F 220/28 (2006.01)
C11D 3/37 (2006.01)
C11D 11/00 (2006.01)
C11D 17/04 (2006.01)

(52) U.S. Cl.
CPC ............ C08F 220/28 (2013.01); C11D 3/378 (2013.01); C11D 11/0023 (2013.01); C11D 17/045 (2013.01); *C08F 220/286* (2020.02); *C08F 2800/20* (2013.01)

(58) Field of Classification Search
CPC ............... C08F 220/28; C08F 220/286; C08F 2800/20; C11D 3/378; C11D 11/0023; C11D 17/045
USPC ........................................................ 526/263
See application file for complete search history.

(56) References Cited

U.S. PATENT DOCUMENTS

| 6,329,483 B1 | 12/2001 | Schade et al. |
| 7,790,667 B2 | 9/2010 | Boeckh et al. |
| 8,153,740 B2 | 4/2012 | Nguyen-Kim et al. |
| 2007/0129516 A1 | 6/2007 | Detering et al. |
| 2014/0378639 A1 | 12/2014 | Blondel et al. |

FOREIGN PATENT DOCUMENTS

| DE | 10062355 A1 * | 6/2001 |
| WO | WO-9322358 A1 | 11/1993 |
| WO | WO-0039176 A1 | 7/2000 |
| WO | WO-0105874 A1 | 1/2001 |
| WO | WO-2004058837 A2 | 7/2004 |
| WO | WO-2005049674 A1 | 6/2005 |
| WO | WO-2005049676 A1 | 6/2005 |
| WO | WO-2016127387 A1 | 8/2016 |

(Continued)

OTHER PUBLICATIONS

International Search Report for PCT/EP2017/057757 dated May 22, 2017.
Written Opinion of the International Searching Authority for PCT/EP2017/057757 dated May 22, 2017.
U.S. Appl. No. 62/286,620.
U.S. Appl. No. 61/286,997.
European Search Report for EP Patent Application No. 16164376.2, dated Sep. 21, 2016.

(Continued)

*Primary Examiner* — William K Cheung
(74) *Attorney, Agent, or Firm* — Faegre Drinker Biddle & Reath LLP

(57) ABSTRACT

A copolymer which comprises, in copolymerized form, (A) 60 to 99% by weight of at least one monoethylenically unsaturated polyalkylene oxide monomer of the formula I (I) in which the variables have the following meanings: X is —$CH_2$— or —CO—, if Y is —O—; is —CO—, if Y is —NH—; Y is —O— or —NH—; $R^1$ is hydrogen or methyl; $R^2$ are identical or different $C_2$-$C_6$-alkylene radicals, which may be arranged blockwise or randomly; $R^3$ is hydrogen or $C_1$-$C_4$-alkyl; n is an integer from 25 to 75, (B) 1 to 40% by weight of at least one quaternized nitrogen-containing monoethylenically unsaturated monomer selected from the group consisting of monomers of formula IIa to IId (IIa-IId) in which the variables have the following meanings: R is $C_1$-$C_4$-alkyl or benzyl; R' is hydrogen or methyl; Y is —O— or —NH—; A is $C_1$-$C_6$-alkylene; X— is halide, $C_1$-$C_4$-alkyl sulfate, $C_1$-$C_4$-alkylsulfonate and Ci-C4-alkyl carbonate, (C) 0 to 10% by weight of anionic monoethylenically unsaturated monomers, and (D) 0 to 30% by weight of other nonionic monoethylenically unsaturated monomers and has an average molecular weight Mw of >100,000.

5 Claims, No Drawings

(56) References Cited

FOREIGN PATENT DOCUMENTS

| WO | WO-2017147889 A1 | 9/2017 |
| WO | WO-2017176481 A1 | 10/2017 |
| WO | WO-2017176500 A1 | 10/2017 |
| WO | WO-2017176501 A1 | 10/2017 |
| WO | WO-2017176851 A1 | 10/2017 |

\* cited by examiner

COPOLYMERS COMPRISING POLYALKYLENE OXIDE GROUPS AND QUATERNARY NITROGEN ATOMS

CROSS-REFERENCE TO RELATED APPLICATIONS

This application is a national stage application (under 35 U.S.C. § 371) of PCT/EP2017/057757, filed Mar. 31, 2017, which claims benefit of European Application No. 16164376.2, filed Apr. 8, 2016, both of which are incorporated herein by reference in their entirety.

The present invention relates to novel copolymers which comprise, in copolymerized form,
(A) 60 to 99% by weight of at least one monoethylenically unsaturated polyalkylene oxide monomer of the formula I

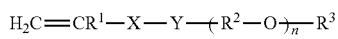

in which the variables have the following meanings:
X is —CH$_2$— or —CO—, if Y is —O—;
    is —CO—, if Y is —NH—;
Y is —O— or —NH—;
R$^1$ is hydrogen or methyl;
R$^2$ are identical or different C$_2$-C$_5$-alkylene radicals, which may be linear or branched and may be arranged blockwise or randomly;
R$^3$ is hydrogen or C$_1$-C$_4$-alkyl;
n is an integer from 25 to 75, preferably 45 to 70, more preferably 45 to 65, more preferably 50 to 65, and most preferably 51 to 65.
(B) 1 to 40% by weight of at least one quaternized nitrogen-containing monoethylenically unsaturated monomer,
(C) 0 to 10% by weight of anionic monoethylenically unsaturated monomers and
(D) 0 to 30% by weight of other nonionic monoethylenically unsaturated monomers
and have an average molecular weight M$_w$ of >100,000.

These copolymers are useful in automatic dish washing (ADW) compositions, hand dish washing compositions, and hard surface cleaners.

In the washing process, a distinction is drawn between primary and secondary detergency. Primary detergency is understood as meaning the actual removal of soiling from the textile ware. Secondary detergency is understood as meaning the prevention of the effects which arise as a result of the redeposition of the detached soiling from the wash liquor onto the fabric. The textiles become increasingly gray from washing operation to washing operation and this insidious graying process can scarcely be reversed. In order to protect textiles made of cotton from becoming gray, sodium salts of carboxymethylcellulose (CMC) are often added to the detergent. Polyacrylic acids and acrylic acid-maleic acid copolymers also have a graying-inhibiting action. However, the action of said polymers is not satisfactory for clay-containing soiling.

WO-A-93/22358 describes thickeners and dispersants for cosmetic preparations which are based on copolymers of at least 50% by weight of an anionic monomer, such as acrylic acid, and up to 50% by weight of an olefinically unsaturated quaternary ammonium compound. The copolymers can comprise, as further comonomer, a (meth)-acrylic ester, with (meth)acrylic esters of alcohols reacted with alkylene oxide also being specified as possible comonomers. However, only copolymers which comprise stearyl methacrylate as comonomer are explicitly disclosed, and then only in amounts of at most 2.4% by weight.

WO-00/39176 discloses the use of copolymers of anionic, cationic and nonionic monomers as thickeners or rheology improvers for cosmetic and pharmaceutical preparations. Although (meth)acrylic esters of alkoxylated alcohols are listed as possible nonionic comonomers, it is pointed out that they must only be present in small amounts since otherwise the glass transition temperature of the copolymers is lowered.

In addition, WO-01/05874 describes zwitterionic polyamines which are obtained by alkoxylation of polyamines and subsequent quaternization and sulfation, and are suitable for the removal of clay-containing soiling from textiles.

Finally, DE-A-100 62 355 discloses copolymers of anionic, cationic and water-insoluble nonionic monomers for surface-treatment. Correspondingly, said nonionic monomers do not have alkylene oxide blocks, and their proportion in the copolymers is at most 16% by weight.

It is an object of the present invention to provide polymeric detergent additives which are characterized by overall advantageous application properties, in particular have improved primary and secondary detergency and can be readily and stably incorporated into solid and liquid detergent formulations for automatic dish washing (ADW), hand dish washing, and hard surface cleaning.

In accordance with the present invention, it has been found that this object is achieved by copolymers which comprise, in copolymerized form,
(A) 60 to 99% by weight of at least one monoethylenically unsaturated polyalkylene oxide monomer of the formula I

in which the variables have the following meanings:
X is —CH$_2$— or —CO—, if Y is —O—;
    is —CO—, if Y is —NH—;
Y is —O— or —NH—;
R$^1$ is hydrogen or methyl;
R$^2$ are identical or different C$_2$-C$_6$-alkylene radicals, which may be linear or branched and may be arranged blockwise or randomly;
R$^3$ is hydrogen or C$_1$-C$_4$-alkyl;
n is an integer from 25 to 75, preferably 45 to 70, more preferably 45 to 65, more preferably 50 to 65, and most preferably 51 to 65 (monomer (A)),
(B) 1 to 40% by weight of at least one quaternized nitrogen-containing monoethylenically unsaturated monomer (monomer (B)),
(C) 0 to 10% by weight of anionic monoethylenically unsaturated monomers (monomer (C)), and
(D) 0 to 30% by weight of other nonionic monoethylenically unsaturated monomers (monomer (D)),
and have a weight average molecular weight M$_w$ of >100,000. In one embodiment, the copolymers of the present invention have a weight average molecular weight M$_w$ of >100,000 to 1,000,000, from >100,000 to 750,000, >100,000 to 500,000, >100,000 to 400,000, or >100,000 to 300,000. The upper limit of the weight average molecular weight is dependent on the desired viscosity of the inventive copolymer, wherein the viscosity increases with increasing weight average molecular weight.

In context with the present invention, weight average molecular weight $M_w$ and number average molecular weight $M_n$ is preferably determined by Size Exclusion Chromatography (SEC) as known in the art and as further described and exemplified herein. In this context, SEC separation conditions are preferably three hydrophilic Vinylpolymer network gel columns, in distilled water in the presence of 0.1% (w/w) trifluoroacetic acid/0.1 M NaCl at 35° C. Calibration is preferably done with narrowly distributed Poly(2-vinylpyridine)-standard of company PSS, Germany with molecular weights $M_w$=620 to $M_w$=2,070,000.

Preferred copolymers according to the invention comprise, as copolymerized component (A), monoethylenically unsaturated polyalkylene oxide monomers of the formula I in which the variables have the following meanings:

X is —CO—;
Y is —O—;
$R^1$ is hydrogen or methyl;
$R^2$ are identical or different linear or branched $C_2$-$C_4$-alkylene radicals arranged blockwise or randomly, preferably ethylene, 1,2- or 1,3-propylene or mixtures thereof, particularly preferably ethylene;
$R^3$ is methyl;
n is an integer from 5 to 30.

Corresponding to formula I, the monomers (A) are, for example, reaction products of (meth)acrylic acid with polyalkylene glycols which are not terminally capped, terminally capped at one end by alkyl radicals, aminated at one end or terminally capped at one end by alkyl radicals and aminated at one end;

alkyl ethers of polyalkylene glycols which are not terminally capped or terminally capped at one end by alkyl, phenyl or alkylphenyl radicals.

Preferred monomers (A) are the (meth)acrylates and the allyl ethers, where the acrylates and primarily the methacrylates are particularly preferred.

Particularly suitable examples of the monomers (A) which may be mentioned are:

methylpolyethylene glycol (meth)acrylate and (meth)acrylamide, methylpolypropylene glycol (meth)acrylate and (meth)acrylamide, methyl polybutylene glycol (meth)acrylate and (meth)acrylamide, methylpoly(propylene oxide-co-ethylene oxide) (meth)acrylate and (meth)acrylamide, ethylpolyethylene glycol (meth)acrylate and (meth)acrylamide, ethyl polypropylene glycol (meth)acrylate and (meth)acrylamide, ethyl polybutylene glycol (meth)acrylate and (meth)acrylamide and ethylpoly(propylene oxide-co-ethylene oxide) (meth)acrylate and (meth)acrylamide, each with 3 to 50, preferably 3 to 30 and particularly preferably 5 to 30, alkylene oxide units, where methylpolyethylene glycol acrylate is preferred and methylpolyethylene glycol methacrylate is particularly preferred;

ethylene glycol allyl ethers and methylethylene glycol allyl ethers, propylene glycol allyl ethers and methylpropylene glycol allyl ethers each with 3 to 50, preferably 3 to 30 and particularly preferably 5 to 30, alkylene oxide units.

The proportion of monomers (A) in the copolymers according to the invention is 60 to 99% by weight, preferably 65 to 90% by weight.

Monomers (B) which are suitable for the copolymers according to the invention are monomers having the formula IIa to IId:

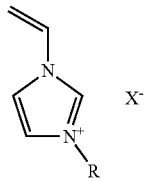

IIa

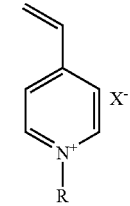

IIb

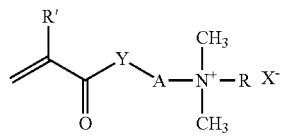

IIc

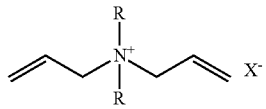

IId

The variables in these formulae have the following meanings:

R is $C_1$-$C_4$-alkyl or benzyl, preferably methyl, ethyl or benzyl;
R' is hydrogen or methyl;
Y is —O— or —NH—;
A is $C_1$-$C_6$-alkylene, preferably straight-chain or branched $C_2$-$C_4$-alkylene, in particular 1,2-ethylene, 1,3- and 1,2-propylene or 1,4-butylene;
X— is halide, such as iodide and preferably chloride or bromide, $C_1$-$C_4$-alkyl sulfate, preferably methyl sulfate or ethyl sulfate, $C_1$-$C_4$-alkylsulfonate, preferably methylsulfonate or ethylsulfonate, and $C_1$-$C_4$-alkyl carbonate.

In one embodiment of the present invention, for monomer (B) a monomer according to formula IIa is preferred.

Specific examples of preferred monomers (B) which may be mentioned include:

3-methyl-1-vinylimidazolium chloride, 3-methyl-1-vinylimidazolium methyl sulfate, 3-ethyl-1-vinylimidazolium ethyl sulfate, 3-ethyl-1-vinylimidazolium chloride and 3-benzyl-1-vinylimidazolium chloride;

1-methyl-4-vinylpyridinium chloride, 1-methyl-4-vinylpyridinium methyl sulfate and 1-benzyl-4-vinylpyridinium chloride;

methacrylamidopropyltrimethylammonium chloride, methacrylamidoethyltrimethyl-ammonium chloride, trimethylammonium ethyl acrylate chloride and methyl sulfate, trimethylammonium ethyl methacrylate chloride and methyl sulfate, dimethylethylammonium ethyl acrylate ethyl sulfate, dimethylethylammoniumethyl methacrylate ethyl sulfate, trimethylammonium propyl acrylate chloride and -methyl sulfate and trimethylammonium propyl methacrylate chloride and methyl sulfate;

dimethyldiallylammonium chloride and diethyldiallylammonium chloride.

Very particularly preferred monomers (B) include 3-methyl-1-vinylimidazolium chloride, 3-methyl-1-vinylimidazolium methyl sulfate, methacrylamidopropyltrimethylammonium chloride, trimethylammonium ethyl methacrylate chloride, dimethylethylammonium ethylmethacrylate ethyl sulfate and dimethyldiallylammonium chloride.

The copolymers according to the invention comprise 1 to 40% by weight, preferably 3 to 30% by weight, of monomer (B).

The weight ratio of (A) to (B) is preferably 2:1.

In general and for the avoidance of any doubt, as used herein and unless specifically described otherwise, in the term "monoethylenically unsaturated monomer" the adverb "monoethylenically" refers to "unsaturated". That is, a monomer (B) according to the present invention means monomers which are monoethylenically unsaturated, while it does not require that there may be only one ethyl group in the monomer.

As optional monomers (C), the copolymers according to the invention may comprise anionic monoethylenically unsaturated monomers.

Suitable monomers (C) are, for example:
α,β-unsaturated monocarboxylic acids which preferably have 3 to 6 carbon atoms, such as acrylic acid, methacrylic acid, ethacrylic acid, crotonic acid and vinylacetic acid, preference being given to acrylic acid and methacrylic acid;
unsaturated dicarboxylic acids, which preferably have 4 to 6 carbon atoms, such as itaconic acid and maleic acid, anhydrides thereof, such as maleic anhydride;
ethylenically unsaturated sulfonic acids, such as vinylsulfonic acid, acrylamidopropanesulfonic acid, methallylsulfonic acid, methacrylsulfonic acid, m- and p-styrenesulfonic acid, (meth)acrylamidomethanesulfonic acid, (meth)acrylamido-ethanesulfonic acid, (meth)acrylamidopropanesulfonic acid, 2-(meth)acrylamido-2-methylpropanesulfonic acid, 2-acrylamido-2-butanesulfonic acid, 3-methacrylamido-2-hydroxypropanesulfonic acid, methanesulfonic acid acrylate, ethanesulfonic acid acrylate, propanesulfonic acid acrylate, allyloxybenzenesulfonic acid, methallyloxybenzenesulfonic acid and 1-allyloxy-2-hydroxypropanesulfonic acid;
ethylenically unsaturated phosphonic acids, such as vinylphosphonic acid and m- and p-styrenephosphonic acid;
acidic phosphate esters of $C_2$-$C_4$-alkylene glycol mono(meth)acrylates and poly($C_2$-$C_4$-alkylene) glycol mono(meth)acrylates, such as ethylene glycol mono(meth)acrylate, propylene glycol mono(meth)acrylate, polyethylene glycol mono(meth)acrylates and polypropylene glycol mono(meth)acrylates.

The anionic monomers (C) can be present in the form of free acids or in salt form, especially in the form of alkali metal and ammonium, in particular alkylammonium, salts, preferred salts being the sodium salts.

Preferred monomers (C) are acrylic acid, methacrylic acid, maleic acid, vinylsulfonic acid, 2-(meth)acrylamido-2-methylpropanesulfonic acid and vinylphosphonic acid, particular preference being given to acrylic acid, methacrylic acid and 2-acrylamido-2-methylpropanesulfonic acid.

The proportion of the monomers (C) in the polymers according to the invention can be up to 39% by weight, preferably up to 30%, more preferably up to 20%, more preferably up to 10% by weight. The minimum content of component (C) in this context may be 0%, preferably at least 3% by weight. For example, the polymer according to the present invention may contain 3 to 30% by weight of component (C).

If the monomers (C) are present in the polymers according to the invention, then the weight ratio of (B) to (C) is preferably 2:1, more preferably 2.5:1. In one specific embodiment of the present invention, the weight ratio of (B) to (C) results in a copolymer which has an overall net cationic charge.

As optional monomer (D), the copolymers according to the invention can comprise further nonionic monoethylenically unsaturated monomers.

Suitable monomers (D) include, for example:
esters of monoethylenically unsaturated $C_3$-$C_6$-carboxylic acids, especially acrylic acid and methacrylic acid, with monohydric $C_1$-$C_{22}$-alcohols, in particular $C_1$-$C_{16}$-alcohols; and hydroxyalkyl esters of monoethylenically unsaturated $C_3$-$C_6$-carboxylic acids, especially acrylic acid and methacrylic acid, with divalent $C_2$-$C_4$-alcohols, such as methyl (meth)acrylate, ethyl (meth)acrylate, n-butyl (meth)acrylate, sec-butyl (meth)acrylate, tert-butyl (meth)acrylate, ethylhexyl (meth)acrylate, decyl (meth)acrylate, lauryl (meth)acrylate, isobornyl (meth)acrylate, cetyl (meth)acrylate, palmityl (meth)acrylate and stearyl (meth)acrylate, hydroxyethyl (meth)acrylate, hydroxypropyl (meth)acrylate and hydroxybutyl (meth)acrylate;
amides of monoethylenically unsaturated $C_3$-$C_6$-carboxylic acids, especially acrylic acid and methacrylic acid, with $C_1$-$C_{12}$-alkylamines and di($C_1$-$C_4$-alkyl)amines, such as N-methyl(meth)acrylamide, N,N-dimethyl(meth)acrylamide, N-ethyl-(meth)acrylamide, N-propyl(meth)acrylamide, N-tert-butyl(meth)acrylamide, N-tert-octyl(meth)acrylamide and N-undecyl(meth)acrylamide, and (meth)acrylamide; vinyl esters of saturated $C_2$-$C_{30}$-carboxylic acids, in particular $C_2$-$C_{14}$-carboxylic acids, such as vinyl acetate, vinyl propionate, vinyl butyrate, vinyl 2-ethylhexanoate and vinyl laurate;
vinyl $C_1$-$C_{30}$-alkyl ethers, in particular vinyl $C_1$-$C_{18}$-alkyl ethers, such as vinyl methyl ether, vinyl ethyl ether, vinyl n-propyl ether, vinyl isopropyl ether, vinyl n-butyl ether, vinyl isobutyl ether, vinyl 2-ethylhexyl ether and vinyl octadecyl ether;
N-vinylamides and N-vinyllactams, such as N-vinylformamide, N-vinyl-N-methyl-formamide, N-vinylacetamide, N-vinyl-N-methylacetamide, N-vinylpyrrolidone, N-vinylpiperidone and N-vinylcaprolactam;
aliphatic and aromatic olefins, such as ethylene, propylene, $C_4$-$C_{24}$-α-olefins, in particular $C_4$-$C_{16}$-α-olefins, e.g. butylene, isobutylene, diisobutene, styrene and α-methylstyrene, and also diolefins with an active double bond, e.g. butadiene;
unsaturated nitriles, such as acrylonitrile and methacrylonitrile.

Preferred monomers (D) are methyl (meth)acrylate, ethyl (meth)acrylate, (meth)acrylamide, vinyl acetate, vinyl propionate, vinyl methyl ether, N-vinylformamide, N-vinylpyrrolidone and N-vinylcaprolactam.

If the monomers (D) are present in the copolymers according to the invention, then their proportion may be up to 30% by weight.

The copolymers according to the invention have an weight average molecular weight $M_w$ of >100,000. In one embodiment, the copolymers of the present invention have a weight average molecular weight $M_w$ of >100,000 to 1,000,000, from >100,000 to 750,000, >100,000 to 500,000, >100,000 to 400,000, or >100,000 to 300,000. The upper limit of the weight average molecular weight is dependent on the desired viscosity of the inventive copolymer, wherein the viscosity increases with increasing average molecular weight.

The copolymers according to the invention can be prepared by free-radical polymerization of the monomers (A) and (B) and if desired (C) and/or (D).

Instead of the quaternized monomers (B), it is also possible to use the corresponding tertiary amines. In this case, the quaternization is carried out after the polymerization by reacting the resulting copolymer with alkylating agents, such as alkyl halides, dialkyl sulfates and dialkyl carbonates, or benzyl halides, such as benzyl chloride. Examples of suitable alkylating agents which may be mentioned are, methyl chloride, bromide and iodide, ethyl chloride and bromide, dimethyl sulfate, diethyl sulfate, dimethyl carbonate and diethyl carbonate.

The anionic monomers (C) can be used in the polymerization either in the form of the free acids or in a form partially or completely neutralized with bases. Bases suitable for the neutralization are inorganic bases, such as alkali metal hydroxides, alkali metal carbonates and hydrogen carbonates and ammonia, and organic bases, such as amines, in particular alcohol amines. Specific examples which may be listed are: sodium hydroxide solution, potassium hydroxide solution, sodium carbonate, sodium hydrogen carbonate, ethanolamine, diethanolamine and triethanolamine.

The free-radical polymerization of the monomers can be carried out in accordance with all known methods, preference being given to the processes of solution polymerization and of emulsion polymerization.

The polymerization is advantageously carried out in water. However, it is also possible to use mixtures of water and polar organic solvents or polar organic solvents on their own as reaction medium.

Examples of suitable organic solvents are aliphatic and cycloaliphatic monohydric alcohols, such as methanol, ethanol, n-propanol, isopropanol, n-butanol, sec-butanol, tert-butanol, n-hexanol and cyclohexanol, polyhydric alcohols, e.g. glycols, such as ethylene glycol, propylene glycol and butylene glycol, and glycerol, alkyl ethers of polyhydric alcohols, e.g. methyl and ethyl ethers of said dihydric alcohols, ether alcohols, such as diethylene glycol, triethylene glycol and dipropylene glycol, cyclic ethers, such as tetrahydrofuran and dioxane, and ketones, such as acetone.

Suitable polymerization initiators are compounds which decompose thermally or photochemically (photoinitiators) to form free radicals.

Among the thermally activatable polymerization initiators, preference is given to initiators with a decomposition temperature in the range of from 20 to 180° C., in particular of from 50 to 90° C. Examples of particularly preferred thermal initiators are inorganic peroxo compounds, such as peroxodisulfates (ammonium and, preferably, sodium peroxodisulfate), peroxosulfates, percarbonates and hydrogen peroxide; organic peroxo compounds, such as diacetyl peroxide, di-tert-butyl peroxide, diamyl peroxide, dioctanoyl peroxide, didecanoyl peroxide, dilauroly peroxide, dibenzoyl peroxide, bis(o-tolyl) peroxide, succinyl peroxide, tert-butyl peracetate, tert-butyl permaleate, tert-butyl perisobutyrate, tert-butyl perpivalate, tert-butyl peroctoate, tert-butyl perneodecanoate, tert-butyl perbenzoate, tert-butyl peroxide, tert-butyl hydroperoxide, cumene hydroperoxide, tert-butyl peroxy-2-ethylhexanoate and diisopropyl peroxy-dicarbamate, azo compounds, such as 2,2'-azobisisobutyronitrile, 2,2'-azobis-(2-methylbutyronitrile), 2,2'-azobis(N,N'-dimethyleneisobutyramidine) dihydrochloride and azobis(2-amidinopropane) dihydrochloride.

Examples of suitable photoinitiators are benzophenone, acetophenone, benzoin ether, benzyl dialkyl ketones and derivatives thereof.

The polymerization initiators are used according to the requirements of the material to be polymerized, usually in amounts of from 0.01 to 15% by weight, preferably 0.5 to 5% by weight, in each case based on the monomers to be polymerized, and can be used individually or, to exploit advantageous synergistic effects, in combination with one another.

To limit the molar masses of the copolymers according to the invention, customary regulators can be added during the polymerization, e.g. mercapto compounds, such as mercaptoethanol, thioglycolic acid and sodium disulfite, or phosphite compounds such as sodium hypophosphite. Suitable amounts of regulator are generally 0.01 to 10% by weight, preferably 0.1 to 5% by weight, based on the monomers to be polymerized.

The polymerization temperature is generally 10 to 200° C., especially 50 to 100° C.

The polymerization is preferably carried out under atmospheric pressure. It can, however, also be carried out in a closed system under the autogenous pressure which develops.

The copolymers according to the invention are excellently suitable for hard surface cleaning.

The copolymers according to the invention are suitable in particular as additive for solid and liquid detergents for automatic dishwashing (ADW), hand dish washing, and hard surface cleaning.

The following examples illustrate the present invention and must not be construed as limiting the invention to any embodiment described in said examples.

EXAMPLES

All Trademarks referred to herein represent compounds/composition as of Jan. 1, 2015 unless specifically indicated otherwise.

Copolymer Synthesis
GPC(SEC) Method:

The weight average molecular weight $M_w$ and number average molecular weight $M_n$ of the polymers was determined by the technique of Size Exclusion Chromatography (SEC). SEC separation conditions were three hydrophilic Vinylpolymer network gel columns, in distilled water in the presence of 0.1% (w/w) trifluoroacetic acid/0.1 M NaCl at 35° C. Calibration was done with narrowly distributed Poly(2-vinylpyridine)-standard of company PSS, Germany with molecular weights Mw=620 to M=2,070,000.

Example P1

MPEG-MA/QVI, 80/20 wt %, EO Units Approx. 45

In a 4 L stirred vessel, water (838.5 g) was charged and heated to 90° C. under a flow of nitrogen. A solution of Wako V50 (1.35 g, Wako Pure Chemical Industries, Ltd.) in water (12.15 g) was added over 4 h and a solution of methoxy-polyethylenglycol methacrylate with molecular weight approx. 2000 g/mol (50%, 1080 g, Visiomer MPEG 2005 MA W, Evonik Industries) and 3-Methyl-1-vinyl-1H-imidazolium-methyl-sulfat ("QVI", 45%, 300 g, BASF SE) over 3 hours. The polymerization mixture was kept at this temperature for additional 30 min after both streams were finished. Subsequently, a solution of Wako V50 (3.38 g) in water (30.38 g) was added over 15 min, stirred for 1 h, then left to cool down to room temperature. The GPC provided values of $M_w$=143,000 g/mol and $M_n$=30,300 g/mol.

Example P2

ADW with MPEG 3000, RD199517, GM0006-53; MPEG-MA/QVI, 80/20 wt %, EO units approx. 65

In a 2 L stirred vessel, water (374.9 g) was charged and heated to 90° C. under a flow of nitrogen. A solution of Wako V50 (0.65 g, Wako Pure Chemical Industries, Ltd.) in water (12.31 g) was added over 4 h and a solution of methoxypolyethylenglycol methacrylate with molecular weight approx. 3000 g/mol (50%, 518.4 g) and 3-Methyl-1-vinyl-1H-imidazolium-methyl-sulfat (45%, 144 g, BASF SE) over 3 hours. The polymerization mixture was kept at this temperature for additional 30 min after both streams were finished. Subsequently, a solution of Wako V50 (1.62 g) in water (30.78 g) was added over 1 h, then left to cool down to room temperature. The GPC provided values of $M_w$=138,000 g/mol and $M_n$=10,900 g/mol.

Example P3

80/20 Mpeg-Ma/QVI, Approx. 45 EO Units.

In a 2 L stirred vessel water (152.61 g) and Sodium hypophosphite monohydrate (0.61 g) was charged and heated to 90° C. under a flow of nitrogen. A solution of sodium peroxodisulfate (2.35 g) in water (21.14 g) was added over 4 h and a solution of methoxypolyethylenglycol methacrylate with molecular weight of approx. 2000 g/mol (50%, 648 g) and 3-Methyl-1-vinyl-1H-imidazolium-methyl-sulfat (45%, 188.1 g) over 3 hours. The polymerization mixture was kept at this temperature for an additional 30 min after both streams have finished. Subsequently a solution of sodium persulfate (2.03 g) in water (18.23 g) was added over 15 min, stirred for 1 h and then left to cool down to room temperature. The GPC gave values of $M_w$=116,000 g/mol and $M_n$=4,190 g/mol.

Copolymer C:
80/20 MPEG EO45/QVI, MW 100,000

In a 4 L stirred vessel water (280.8 g) was charged and heated to 90° C. under a flow of nitrogen. A solution of Wako V50 (2.40 g, Wako Pure Chemical Industries, Ltd.) in water (24.00 g) was added over 4 h and a solution of methoxy-polyethylenglycol methacrylate with molecular weight approx. 2000 g/mol (50%, 384.00 g, Visiomer MPEG 2005 MA W, Evonik Industries) and 3-Methyl-1-vinyl-1H-imidazolium-methyl-sulfat (45%, 106.67 g, BASF SE) over 3 hours. The polymerization mixture is kept at this temperature for an additional 30 min after both streams have finished. Subsequently, a solution of Wako V50 (1.20 g) in water (12.00 g) was added over 15 min, stirred for 1 h and then left to cool down to room temperature. The GPC gave values of Mw=100,000 g/mol.

Copolymer D:
80/20 MPEG EO45/QVI, MW 179,000

In a 4 L stirred vessel water (312.45 g) was charged and heated to 90° C. under a flow of nitrogen. A solution of Wako V50 (0.27 g, Wako Pure Chemical Industries, Ltd.) in water (26.46 g) was added over 4 h and a solution of methoxy-polyethylenglycol methacrylate with molecular weight approx. 2000 g/mol (50%, 432.00 g, Visiomer MPEG 2005 MA W, Evonik Industries) and 3-Methyl-1-vinyl-1H-imidazolium-methyl-sulfat (45%, 120.00 g, BASF SE) over 3 hours. The polymerization mixture was kept at this temperature for an additional 30 min after both streams have finished. Subsequently, a solution of Wako V50 (1.35 g) in water (13.50 g) was added over 15 min, stirred for 1 h and then left to cool down to room temperature.

The GPC gave values of Mw=179,000 g/mol and Mn=32,900 g/mol.

All polymers used for the examples not listed above are prepared similarly to these examples.

Dishwashing Examples

The following example dishwashing compositions were prepared, composition A, C, and E, comprising a copolymer according to the invention and compositions B and D as comparative references outside the scope of the invention. The compositions were made into superposed dual-compartment water-soluble pouches. One compartment contained the solid composition and the other compartment the liquid composition.

TABLE 1

Formulations

| | Compositions (g/active per wash) | | | | |
|---|---|---|---|---|---|
| | A | B | C | D | E |
| Powder section | | | | | |
| Sodium Carbonate | 7.0 | 7.0 | 6.4 | 6.4 | 6.4 |
| MGDA | 2.2 | 2.2 | 2.8 | 2.8 | 2.8 |
| Sulphonated polymer | 1.5 | 1.5 | 1.0 | 1.0 | 1.0 |
| Percarbonate | 1.4 | 1.4 | 0.9 | 0.9 | 0.9 |
| Bleach activator | 0.3 | 0.3 | — | — | — |
| Bleach catalyst | 1 mg | 1 mg | 1 mg | 1 mg | 1 mg |
| Nonionic surfactant 1 | 0.1 | 0.1 | 0.1 | 0.1 | 0.1 |
| Stainzyme Plus | 3 mg | 3 mg | 9 mg | 9 mg | 9 mg |
| Ultimase | 10 mg | 10 mg | 34 mg | 34 mg | 34 mg |
| HEDP | 0.1 | 0.1 | — | — | — |
| Polymer of example P1 according to the invention | 0.5 | — | 0.5 | — | — |
| Copolymer D according to the invention | — | — | — | — | 0.5 |
| Copolymer 3 as reference | — | 0.5 | — | 0.5 | — |
| Liquid section | | | | | |
| Nonionic surfactant 1 | 0.7 | 0.7 | 0.7 | 0.7 | 0.7 |
| Nonionic surfactant 2 | 0.9 | 0.9 | 0.9 | 0.9 | 0.9 |
| DPG | 0.4 | 0.4 | 0.4 | 0.4 | 0.4 |
| Water soluble film | | | | | |
| PVA | 0.6 | 0.6 | 0.6 | 0.6 | 0.6 |

MGDA Trisodium salt of methylglycinediacetic acid, supplied by BASF
Sulphonated Polymer Acusol 588 supplied by Rohm & Haas
Bleach activator Tetraacetylethylenediamine
Bleach catalyst pentaamino cobalt acetate nitrate
Nonionic surfactant 1 Plurafac SLF 180, supplied by BASF.
Nonionic surfactant 2 Lutensol TO7, supplied by BASF.
HEDP 1-hydroxyethane 1,1-diphosphonic acid
Polymer of example P1 80% wt MPEG with 45 EO and 20% wt QVI, Mw 143,000
Copolymer D 80% wt MPEG with 45 EO and 20% wt QVI, Mw 179,000
Copolymer 3 95% wt MPEG with 45 EO and 5% wt QVI, Mw 10,800
(Outside the scope of the invention)

To demonstrate the benefit of the present invention, the number of spots left on glasses and plastic tumblers were counted, the glasses and tumblers were washed 5 times in a dishwasher using the automatic dishwashing cleaning compositions shown in Table 1. Compositions B and D are comparative (they comprise a copolymer with a weight average molecular weight outside the scope of the claims). Compositions A, C, and E are compositions according to the invention.

Test Method

Soil 1 is prepared with the following protocol:

| Ingredient | Weight | Tolerance |
|---|---|---|
| Potato Starch - Tipiak (Fecule) | 136 g | ±0.5 g |
| Wheat Flour - Rochambeau (Farine de ble) | 109.5 | ±0.5 g |
| Vegetable oil - Asda | 108 g | ±0.5 g |
| Margarine - Stork | 108 g | ±0.5 g |
| Lard - Asda | 108 g | ±0.5 g |
| Single Cream | 219 g | ±0.5 g |
| Baking Spread - Asda Best for Baking | 108 g | ±0.5 g |
| Large Eggs | 219 g | ±0.5 g |
| Whole Milk - Asda Own | 219 g | ±0.5 g |
| Ketchup - Heinz | 75 g | ±0.5 g |
| Mustard - Amora, Moutarde de Dijon | 100 g | ±0.5 g |
| Benzoic - ex Fluka or equivalent | 18.5 g | ±0.2 g |
| Hard Water | 918 g | ±1 g |
| Total | 2446 | |

1. Weigh out the appropriate amounts of each ingredient as detailed above.
2. Add water to the potato starch, heat in a pan until a gel is formed. Leave the pan to cool at room temperature overnight.
3. Add the Ketchup and mustard to a bowl and mix vigorously using Blixer Coupe 5VV (Speed 6) until fully combined, 1 minute.
4. Melt Margarine (1 min), lard (2 min) and baking spread (1 min) individually in a microwave (full power 750 W) and allow to cool to room temperature (15 mins) then mix together vigorously
5. Add Wheat Flour and Benzoic acid to a bowl and mix vigorously.
6. Break 5-6 large eggs into a bowl and mix vigorously (1 min).
7. Weigh out 219 g of the eggs into a bowl. Add 219 g vegetable oil to the eggs and stir using a hand blender (1 min)
8. Mix the cream and milk in a bowl (1 min)
9. Add all of the ingredients together into a large container and mix vigorously (10 mins)
10. Weigh out 50 g batches of this mixture into plastic pots and freeze.

Margarine-Milk soil is prepared as follows:

| Ingredient | Weight |
|---|---|
| Stork margarine | 1 kg |
| Marvel powdered milk | 250 g |
| Total | 1.25 kg |

1. Add the Stork margarine in a pan and with slow heat melt the margarine.
2. Slowly add the powdered milk and stir continuously.
3. Let the mixture cool down and once it has solidify mixed with a hand blender to homogenize the mixture.
4. Keep in the fridge.

Three new Libbey glasses per composition were washed with a standard dishwashing detergent followed by an acidic wash with 20 g of food-grade citric acid powder; both washes were carried out using soft water (3 US gpg), in a normal 50° C. cycle.

Example 1

The multi-cycle test was carried out using a Miele dishwasher, in a normal wash 50° C. setting. On each cycle 50 g of soil 1 were added into the dishwasher at the start of the wash, additionally 50 g of Margarine-Milk soil were spread on two steel pans (25 g per pan) which were added on the bottom basket as ballast. The water hardness was 20 US gpg.

The glasses were washed (5 cycles) with Composition A comprising a copolymer according to the invention and with Composition B, outside the scope of the invention. After running 5 consecutive cycles, the glasses and tumblers were then photographed against a black background and the images were analyzed using computer aided software to count spots on the glasses and tumblers. A spot is defined as a circular cluster larger than 4 pixels with higher gray scale (4 units) versus the background.

TABLE 2

| Number of spots on glasses after 5 cycles | |
|---|---|
| Glass | Spot Count |
| Composition A | 65 |
| Composition B | 104 |

As it can be seen from Table 2, the number of spots on glasses washed with the composition of the invention (Composition A) is significantly smaller than those on glassed washed with a comparative composition (Composition B).

Example 2

A second multicycle test was carried out using a North American Maytag dishwasher, with inlet water pre-heated to 55° C., the wash cycle was set to be normal wash at 55° C. On each cycle 50 g of soil 1 were added into the dishwasher at the start of the wash, additionally 50 g Margarine-Milk soil were spread on two steel pans (25 g per pan) which were added on the bottom basket as ballast. The inlet water was deionised water spiked with $CaCl_2$) and $MgCl_2$ salts up to 21 US gpg with a Ca:Mg molar ratio of 3:1. Two styrene/acrylonitrile tumblers were also included in the test, these were not pretreated and were washed from new.

After running 5 consecutive cycles, the glasses and tumblers were then photographed against a black background and the images were analyzed using computer aided software to count spots on the glasses and tumblers. A spot is defined as a circular cluster larger than 4 pixels with higher gray scale (4 units) versus the background.

TABLE 3

| number of spots on glasses and plastic tumblers after 5 cycles | | |
|---|---|---|
| | Spot count in Glass | Spot count in Plastic |
| Composition C | 33 | 37 |
| Composition D | 83 | 50 |

As it can be seen from Table 3, the number of spots on glasses and plastic tumblers washed with the composition of the invention (Composition C) is significantly smaller than those on glassed and plastic tumblers washed with a comparative composition (Composition D). Glasses and plastic tumblers washed with Composition C present better shine than those washed with Composition D.

The invention claimed is:

1. A copolymer which comprises, in copolymerized form,
(A) 60 to 99% by weight of at least one monoethylenically unsaturated polyalkylene oxide monomer of the formula I

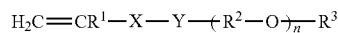

in which the variables have the following meanings:
X is —$CH_2$— or —CO—, if Y is —O—;
  is —CO—, if Y is —NH—;
Y is —O— or —NH—;
$R^1$ is hydrogen or methyl;
$R^2$ are identical or different $C_2$-$C_6$-alkylene radicals, which are arranged blockwise or randomly;
$R^3$ is hydrogen or $C_1$-$C_4$-alkyl;
n is an integer from 25 to 75,
(B) 1 to 40% by weight of at least one quaternized nitrogen-containing monoethylenically unsaturated monomer selected from the group consisting of monomers of formula IIa to IId

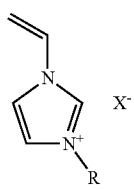

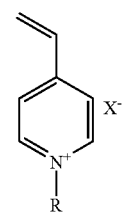

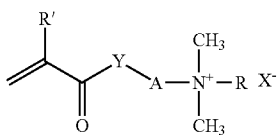

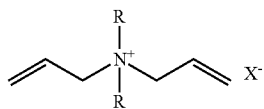

in which the variables have the following meanings:
R is $C_1$-$C_4$-alkyl or benzyl;
R' is hydrogen or methyl;
Y is —O— or —NH—;
A is $C_1$-$C_6$-alkylene;
X— is halide, $C_1$-$C_4$-alkyl sulfate, $C_1$-$C_4$-alkylsulfonate and $C_1$-$C_4$-alkyl carbonate,
(C) 0 to 10% by weight of anionic monoethylenically unsaturated monomers, and
(D) 0 to 30% by weight of other nonionic monoethylenically unsaturated monomers and has an average molecular weight $M_w$ of >100,000.

2. The copolymer according to claim 1, which comprises, in copolymerized form, as monomer (A), at least one monomer of the formula I in which the variables have the following meanings:
X is —CO—;
Y is —O—;
$R^1$ is hydrogen or methyl;
$R^2$ is ethylene, propylene or mixtures thereof;
$R^3$ is methyl;
n is an integer from 51 to 65.

3. The copolymer according to claim 1, which comprises, in copolymerized form, 60 to 98% by weight of monomer (A), 1 to 39% by weight of monomer (B) and 1 to 39% by weight of monomer (C).

4. The copolymer according to claim 1, in which the weight ratio of (A) to (B) is ≥2:1 and for the case where the copolymers comprise a monomer (C) in copolymerized form, the weight ratio of (B) to (C) is also ≥2:1.

5. The copolymer according to claim 1, wherein the overall net charge of said copolymer is cationic.

* * * * *